US012608301B2

(12) United States Patent
Wittmann et al.

(10) Patent No.: US 12,608,301 B2
(45) Date of Patent: Apr. 21, 2026

(54) LANGUAGE-AGNOSTIC UNIT TESTING

(71) Applicant: Red Hat, Inc., Raleigh, NC (US)

(72) Inventors: Eric Philip Wittmann, Hartford, CT (US); Enda Martin Phelan, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 212 days.

(21) Appl. No.: 18/087,038

(22) Filed: Dec. 22, 2022

(65) Prior Publication Data

US 2024/0211384 A1 Jun. 27, 2024

(51) Int. Cl.
*G06F 11/3668* (2025.01)

(52) U.S. Cl.
CPC ...... *G06F 11/3688* (2013.01); *G06F 11/3692* (2013.01)

(58) Field of Classification Search
CPC ................................................. G06F 11/3668
See application file for complete search history.

(56) References Cited

U.S. PATENT DOCUMENTS

| | | | |
|---|---|---|---|
| 7,694,181 B2 | 4/2010 | Noller et al. | |
| 9,519,463 B1 * | 12/2016 | Leippe ................ | G06F 11/3698 |
| 10,444,744 B1 * | 10/2019 | Arguelles ........... | G06F 11/3414 |
| 2011/0265063 A1 * | 10/2011 | de Oliveira Costa .... | G06F 8/75 717/120 |
| 2012/0102458 A1 * | 4/2012 | Meijer ...................... | G06F 8/73 717/123 |
| 2016/0321103 A1 * | 11/2016 | O'Dell ................ | G06F 11/3688 |

| | | | |
|---|---|---|---|
| 2019/0004932 A1 * | 1/2019 | Misra .................. | G06F 11/3698 |
| 2020/0082413 A1 * | 3/2020 | Tseng ................. | G06Q 30/0185 |
| 2020/0363208 A1 * | 11/2020 | Jakel ...................... | G01S 19/04 |
| 2021/0096832 A1 * | 4/2021 | Rich ..................... | G06F 40/154 |
| 2021/0103514 A1 | 4/2021 | Das et al. | |
| 2021/0117313 A1 | 4/2021 | Geary | |
| 2021/0191845 A1 * | 6/2021 | Bach .................. | G06F 11/3688 |

(Continued)

FOREIGN PATENT DOCUMENTS

CN            111382055 A        7/2020

OTHER PUBLICATIONS

Ennart et al.; Integrated Language Definition Testing: Enabling Test-Driven Language Development; Delft University of Technology Software Engineering Research Group Technical Report Series; 2011; 20 pgs.

(Continued)

*Primary Examiner* — Jae U Jeon
(74) *Attorney, Agent, or Firm* — Kilpatrick Townsend & Stockton LLP

(57) ABSTRACT

Systems and methods for language-agnostic unit testing are generally described. In various examples, first data including first source code written in a first programming language may be received. Configuration data configured to execute language-agnostic unit testing may be loaded. Input data may be determined from the first data based on a first input defined by the configuration data for a first unit test. A first driver written in the first programming language may be determined from the configuration data. The first driver may include computer-executable instructions configured to execute the first unit test. First output data may be generated by executing the first computer-executable instructions to perform the first unit test on the first input data.

20 Claims, 5 Drawing Sheets

(56)          References Cited

U.S. PATENT DOCUMENTS

| | | | |
|---|---|---|---|
| 2021/0241266 A1* | 8/2021 | Kamal ............. | G06Q 20/40145 |
| 2023/0325305 A1* | 10/2023 | Rao Pandu ......... | G06F 11/3688 |
| | | | 717/125 |
| 2023/0367562 A1* | 11/2023 | Wilkerson, Jr. .......... | G06F 8/31 |

OTHER PUBLICATIONS

Kreutzer et al.; Language-Agnostic Generation of Compilable Test Programs; 2020 IEEE 13th Intl Conference on Software Testing, Validation and Verification (ICST); 2020; p. 39-50.
BERGERON; Writing a Language-Agnostic Integration Test Suite; GoDaddy Engineering Blog; Retrieved from https:// www.godaddy. com/engineering/2021/06/14/test-harness/ on 2022-11-10; 2021; 6 pgs.

\* cited by examiner

100

```
200

1   ---
 2   name: Example Test Suite
 3   test-cases:
 4   - name: Test Case 1
 5     inputs:
 6     - name: openApiDocument
 7       value: tests/openapi/test-case-1.json
 8     drivers:
 9     - language: java
10       content: src/test/java/org/example/drivers/TestCaseDriver.java
11     - language: python
12       content: src/test/python/drivers/testCase1.py
13     assertions:
14     - type: equals
15       expected: tests/openapi/test-case-1_expected.json
16   - name: Test Case 2
17     inputs:
18     - name: openApiDocument
19       value: tests/openapi/test-case-2.json
20     drivers:
21     - language: java
22       content: src/test/java/org/example/drivers/TestCaseDriver.java
23     - language: python
24       content: src/test/python/drivers/testCase2.py
25     assertions:
26     - type: equals
27       expected: tests/openapi/test-case-2_expected.json
```

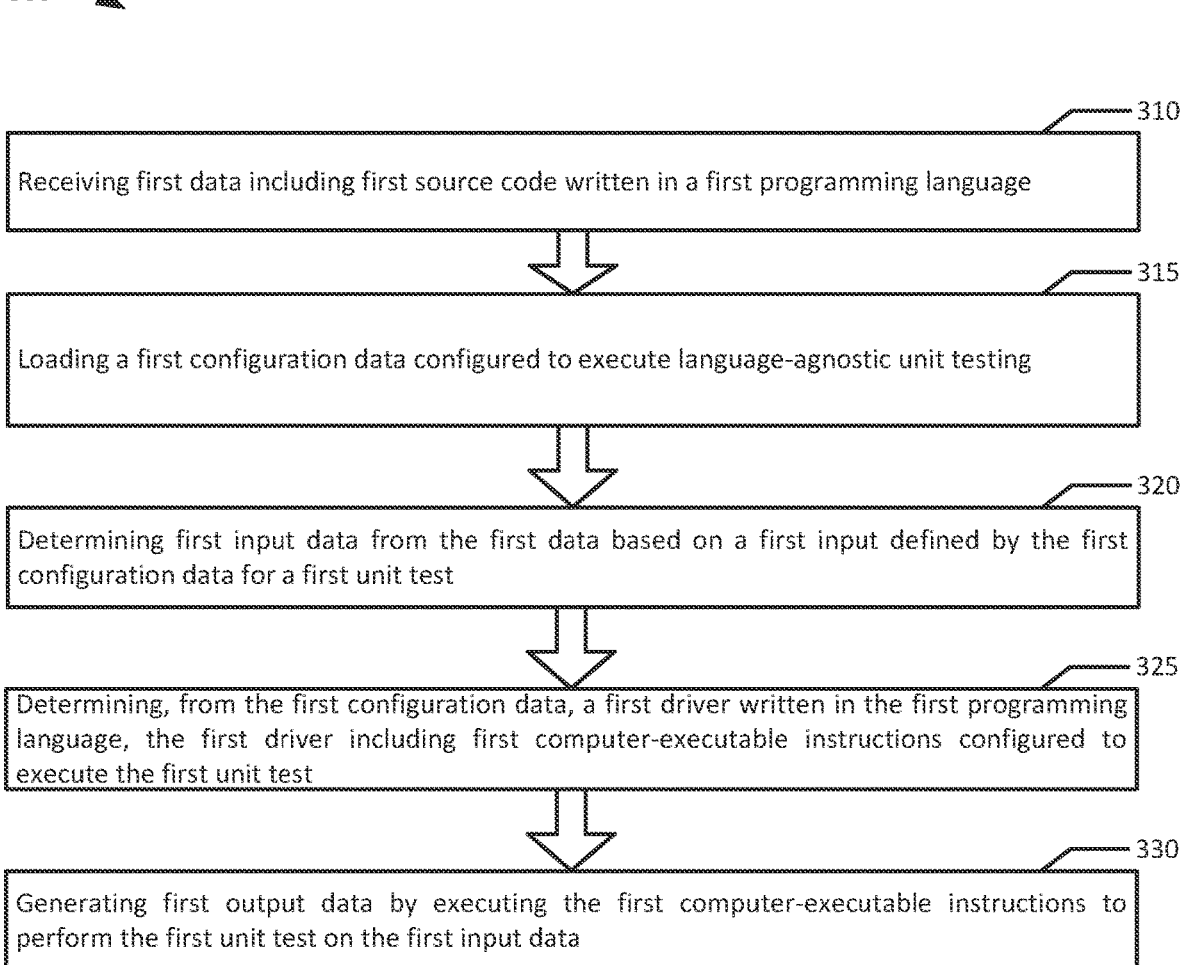

310

Receiving first data including first source code written in a first programming language

315

Loading a first configuration data configured to execute language-agnostic unit testing

320

Determining first input data from the first data based on a first input defined by the first configuration data for a first unit test

325

Determining, from the first configuration data, a first driver written in the first programming language, the first driver including first computer-executable instructions configured to execute the first unit test

330

Generating first output data by executing the first computer-executable instructions to perform the first unit test on the first input data

Fig. 3

LANGUAGE-AGNOSTIC UNIT TESTING

BACKGROUND

Unit testing typically refers to software and/or code testing where individual units or components of a software service are tested. The purpose of unit testing is to validate that each unit (or module) of the software's code performs as expected. Unit tests typically isolate a section of code and verify that it performs as expected. A unit test may be performed to test an individual function, procedure, module, or software-defined object. Unit testing is often performed before integration testing, in which the unit-tested component is integrated into a larger system and the larger system is validated together with the newly-added unit.

SUMMARY

The present disclosure provides a new and innovative system, methods and apparatus for language-agnostic unit testing. In an example, first data including first source code written in a first programming language may be received. First configuration data configured to execute language-agnostic unit testing may be loaded. First input data may be determined from the first data based on a first input defined by the first configuration data for a first unit test. A first driver written in the first programming language may be determined from the first configuration data. The first driver may include first computer-executable instructions configured to execute the first unit test. First output data may be generated by executing the first computer-executable instructions to perform the first unit test on the first input data.

In another example, a system may comprise at least one processor and non-transitory computer-readable memory. The non-transitory computer-readable memory may store instructions that, when executed by the at least one processor are configured to receive first data comprising first source code written in a first programming language. The non-transitory computer-readable memory may store further instructions effective to load a first configuration data configured to execute language-agnostic unit testing. The non-transitory computer-readable memory may store further instructions effective to determine first input data from the first data based on a first input defined by the first configuration data for a first unit test. The non-transitory computer-readable memory may store further instructions effective to determine, from the first configuration data, a first driver written in the first programming language. The first driver may include first computer-executable instructions configured to execute the first unit test. The non-transitory computer-readable memory may store further instructions effective to generate first output data by executing the first computer-executable instructions to perform the first unit test on the first input data.

In yet another example, a non-transitory computer-readable memory is described. The non-transitory computer-readable memory may store instructions that, when executed by at least one processor, are effective to perform a method comprising receiving first data comprising first source code written in a first programming language. The method may further comprise loading a first configuration data configured to execute language-agnostic unit testing. The method may further comprise determining first input data from the first data based on a first input defined by the first configuration data for a first unit test. The method may further include determining, from the first configuration data, a first driver written in the first programming language. The first driver may include first computer-executable instructions configured to execute the first unit test. In some examples, the method may include generating first output data by executing the first computer-executable instructions to perform the first unit test on the first input data.

Additional features and advantages of the disclosed method and apparatus are described in, and will be apparent from, the following Detailed Description and the Figures.

BRIEF DESCRIPTION OF THE FIGURES

FIG. 2 depicts an example of language-agnostic configuration data that may be used to perform unit testing of source code and/or other input data in any desired programming language, in accordance with various aspects of the present disclosure.

FIG. 3 is flowchart illustrating an example process for language-agnostic unit testing according to an example of the present disclosure.

DETAILED DESCRIPTION OF EXAMPLE EMBODIMENTS

Figure 1:
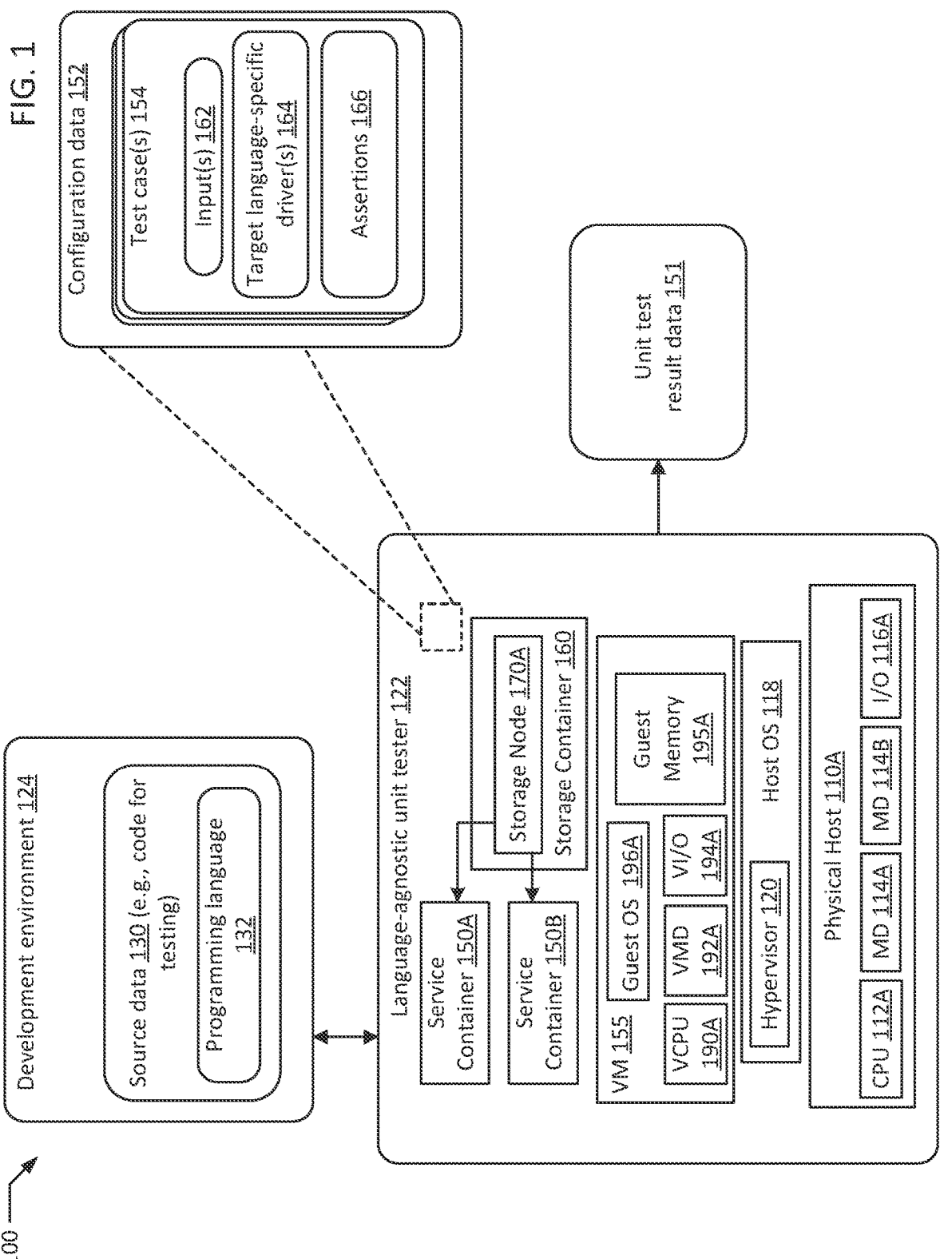
FIG. 1 is a block diagram of a language-agnostic unit tester configured in communication with a development environment, according to various examples of the present disclosure.

Unit testing typically refers to software and/or code testing where individual units or components of a software service are tested. Unit testing may be used to validate that each unit (or module) of the software's code performs as expected, in isolation, prior to performing integration testing in which the unit is deployed within a larger system.

Transpilers allow developers to write source code in one language and have corresponding source code be generated in one or more other target languages. Sometimes this approach is useful when the target language is less structured, making it easier for developers to make mistakes or produce code that is difficult to understand or maintain when coding directly in the target language. In other cases, transpilation of source code may be useful to write code in just one language, but generate multiple language libraries for the code. For example, a developer may write code in Java and have a build pipeline generate a Java JAR file, a Node.js NPM package, and a Python package using transpilation.

In both cases, any unit tests written by the developer to test transpiled source code would ideally only be written once but run in every target language to ensure that the code works in all of the desired target programming languages. However, it is often the case that unit testing frameworks are very language-specific. For example, JUnit is largely specific to Java, while Jest is used for Javascript. As such, it is common practice for developers to write unit tests separately, in each target language, in order to ensure that the resulting code executes as expected in each. Since writing unit tests can represent a significant investment in terms of effort (amount of code and time), it is suboptimal to require developers to write tests for each target language.

Ideally, developers could simply write unit tests in the source language and have those unit tests transpiled into the target language(s) automatically. While this approach makes intuitive sense, each language typically has its own unit testing framework, making it very challenging for a transpiler to appropriately transpile unit tests from one language to another. For example, transpilers are unable to transpile JUnit tests since the target source code languages typically have no direct equivalents to the JUnit-specific semantics used in the JUnit framework.

For example, different unit testing frameworks often use their own specific semantics that do not transpile and which are not portable to other programming languages. For example, JUnit uses javacode annotations that are typically not portable to other unit testing frameworks (such as Jest) and thus are not transpilable. Jest, by contrast, does not use annotations, but instead uses functions.

Consider, for example, the following example JUnit test:

```
package org.example;
import org.junit.Assert;
import org.junit.Test;
public class MathTest {
    @Test // This is the annotation that tells Junit this is a test method
    public void testAdd( ) {
        // The next two lines represent the code being tested
        Math math = new Math(5, 7);
        int value = math.add( );
        // The JUnit-specific assertions are below
        Assert.assertEquals(12, value);
    }
    @Test
    public void testMultiply( ) {
        Math math = new Math(9, 5);
        int value = math.multiply( );
        Assert.assertEquals(45, value);
    }
    @Test(expected = DivideByZeroException.class)
    public void testDivideByZero( ) {
        Math math = new Math(5, 0);
        int value = math.divide( );
        Assert.fail("Expected a divide by zero error.");
    }
```

Additionally, consider the following example Jest test:

```
import { Math } from "Math";
// Jest has a function called "test" that is called. A test name is passed in as well as
// a callback function that represents the body of the test.
test("testAdd", ( ) => {
    // The following two lines are the code under test.
    const math: Math = new Math(5, 7);
    const value: number = math.add( );
    // Next are Jest-specific assertions
    expect(value).toBe(12);
});
test("testMultiply", ( ) => {
    const math: Math = new Math(9, 5);
    const value: number = math.multiply( );
    expect(value).toBe(45);
});
test("testDivideByZero", ( ) => {
    const math: Math = new Math(5, 0);
    const value: number = math.divide( );
    expect(value).toThrow(45);
});
```

The above example JUnit and Jest unit tests are equivalent in terms of the logic they employ to test code. For example, each unit test includes code used to test that a function that adds the integers 5 and 7 results in a sum of 12. However, as can be seen the JUnit and Jest unit tests include different annotations and semantics and, as a result, are unable to be transpiled into desired target programming languages. Transpilers are unable to transpile JUnit unit tests since the target source code languages typically have no equivalents to the annotations and other JUnit-specific semantics used in the JUnit framework. The same is true for transpilation of other language-specific unit testing frameworks.

Described herein are technical solutions (e.g., systems and techniques) that may be used to implement language-agnostic unit testing. For example, language-agnostic unit testing configuration data is described that enables unit testing in any desired target language. The language-agnostic unit testing configuration data is designed to be language agnostic and to define the different unit tests in a language agnostic way.

The language-agnostic configuration data includes a field for the name and/or description of each different unit test (e.g., each method) to be performed. Additionally, the code defining the logic of each individual unit test may be included in the language-agnostic configuration data. In addition, assertion data, which defines the type of comparison between the output of the unit test and the expected output, may be included in the language-agnostic configuration data. Further, the input to the unit test is defined in the language-agnostic unit test. However, the input, name/description, and expected output/assertion type fields are language agnostic and do not include Java annotations and/or any other semantics that are specific to a particular unit testing framework. A driver including the code used to implement the unit test logic may be provided by the developer. Such drivers may be provided in each target language of interest and may be labeled, per programming language, in the language-agnostic configuration data. Additionally, since the drivers include code that is free of the unit-testing specific semantics (such as the Java annotations used by JUnit), the driver code may be transpiled into various target languages. As such, a developer may provide as few as a single driver written in a first source language and may have the driver transpiled into multiple target languages and stored as language-agnostic configuration data. Accordingly, using this language-agnostic configuration data, a particular unit test may be defined a single time, but may be executed in each different target language. The language-agnostic configuration data may be used in a runtime framework that can be added as a dependency in each target language. The same logic may be implemented for a given unit test (using language-specific drivers) to ensure that the results are the same across each programming language's unit tests.

In various examples, the runtime language-agnostic testing framework may read the language-agnostic configuration data and may parse and validate the language-agnostic configuration data to generate a list of test cases (e.g., the unit tests defined by the language-agnostic configuration data). Then, for each unit test, the runtime language-agnostic testing framework may instantiate the relevant driver(s) (e.g., for each of the target language(s)). Then, for each unit test in the language-agnostic configuration data, the runtime framework may invoke the driver(s) and pass the relevant unit test inputs to the driver(s), receive outputs from the driver(s), and perform the assertions (defined in the language-agnostic configuration data) on the outputs to generate and return result data reporting the result of the unit test. Further examples are provided and described below, in reference to the drawings.

FIG. 1 is a block diagram of a system including a language-agnostic unit tester 122 configured in communication with a development environment 124, according to various examples of the present disclosure. The language-agnostic unit tester 122 may be implemented using software, hardware, and/or some combination thereof. In the example depicted in FIG. 1, the language-agnostic unit tester 122 may include one or more physical host(s), including physical host 110A. Physical host 110A may in turn include one or more physical processor(s) (e.g., CPU 112A) communicatively coupled to one or more memory device(s) (e.g., MDs 114A-B) and one or more input/output device(s) (e.g., I/O 116A). As used herein, physical processor or processors 112A refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions and/or threads. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-B refer to volatile or non-volatile memory devices, such as RAM, ROM, EEPROM, or any other device capable of storing data. In an example, memory devices 114A may be persistent storage devices such as hard drive disks ("HDD"), solid state drives ("SSD"), and/or persistent memory (e.g., Non-Volatile Dual In-line Memory Module ("NVDIMM")). Memory devices 114A-B may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A refer to devices capable of providing an interface between one or more processor pins and an external device, the operation of which is based on the processor inputting and/or outputting binary data. CPU(s) 112A may be interconnected using a variety of techniques, ranging from a point-to-point processor interconnect, to a system area network, such as an Ethernet-based network. Local connections within physical hosts 110A, including the connections between processors 112A and memory devices 114A-B and between processors 112A and I/O device 116A may be provided by one or more local buses of suitable architecture, for example, peripheral component interconnect (PCI).

In an example, physical host 110A may run one or more isolated guests, for example, VM 155, which may in turn host additional virtual environments (e.g., VMs and/or containers). In an example, a container (e.g., storage container 160, service containers 150A-B) may be an isolated guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Storage container 160 and/or service containers 150A-B may run directly on a host operating system (e.g., host OS 118) or run within another layer of virtualization, for example, in a virtual machine (e.g., VM 155). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 155 may be a VM executing on physical host 110A.

Language-agnostic unit tester 122 may run one or more VMs (e.g., VMs 122), by executing a software layer (e.g., hypervisor 120) above the hardware and below the VM 155, as schematically shown in FIG. 1. In an example, the hypervisor 120 may be a component of respective host operating system 118 executed on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 155 as devices, including virtual central processing unit ("VCPU") 190A, virtual memory devices ("VMD") 192A, virtual input/output ("VI/O") device 194A, and/or guest memory 195A. In an example, another virtual guest (e.g., a VM or container) may execute directly on host OSs 118 without an intervening layer of virtualization.

In an example, a VM 155 may be a virtual machine and may execute a guest operating system 196A which may utilize the underlying VCPU 190A, VMD 192A, and VI/O 194A. Processor virtualization may be implemented by the hypervisor 120 scheduling time slots on physical CPUs 112A such that from the guest operating system's perspective those time slots are scheduled on a virtual processor 190A. VM 155 may run on any type of dependent, independent, compatible, and/or incompatible applications on the underlying hardware and host operating system 118. The hypervisor 120 may manage memory for the host operating system 118 as well as memory allocated to the VM 155 and guest operating system 196A such as guest memory 195A provided to guest OS 196A. In an example, storage container 160 and/or service containers 150A, 150B are similarly implemented.

In an example, in addition to distributed storage provided by storage container 160, a storage controller may additionally manage storage in dedicated storage nodes (e.g., NAS, SAN, etc.). In an example, a storage controller may deploy storage in large logical units with preconfigured performance characteristics (e.g., storage nodes 170A). In an example, access to a given storage node (e.g., storage node 170A) may be controlled on an account and/or tenant level. In an example, a service container (e.g., service containers 150A-B) may require persistent storage for application data, and may request persistent storage with a persistent storage claim to an orchestrator (not shown in FIG. 1). In the example, a storage controller may allocate storage to service containers 150A-B through a storage node (e.g., storage nodes 170A) in the form of a persistent storage volume. In an example, a persistent storage volume for service containers 150A-B may be allocated a portion of the storage capacity and throughput capacity of a given storage node (e.g., storage nodes 170A). In various examples, the storage container 160 and/or service containers 150A-B may deploy compute resources (e.g., storage, cache, etc.) that are part of a compute service that is distributed across multiple clusters (not shown in FIG. 1).

The various virtualized computing systems (e.g., service containers 150A, 150B, VM 155) may be examples of computing environments that may deploy one or more of the techniques described herein for programmatic unit testing of source data 130 from development environment 124. In various examples, the configuration data 152 may define one or more test cases 154 (e.g., unit tests). Each test case 154 may perform a different test and/or evaluation of input data. Each test case 154 may optionally include a name and/or other identifying data that may be used to identify the test case from among other test cases. In some further examples, each test case 154 may include description data that describes the unit test of the test case. Each test case 154 may define the input(s) 162 used for the unit test. In addition, each test case 154 may include one or more target language-specific drivers 164. Each of the target language-specific drivers 164 may be configured to implement the logic of the specific test case in a specific target language. In various examples, when generating the configuration data 152, a developer may provide a single driver written in one source code language and may specify one or more other target languages. The language-agnostic unit tester 122 may transpile the provided driver into the one or more other target languages and may store the resulting transpiled drivers as target language-specific drivers 164 in test case 154 of the configuration data 152. The target language-specific driver(s) 164 may be the only language-specific part of the configuration data 152. As the target language-specific driver(s) 164 include only the code used to implement the logic without any particular unit testing framework-specific semantics, the target language-specific driver(s) 164 may be transpilable into other target languages.

Assertions 166 may define an assertion type as well as an expected output for the particular test case 154. For example, an assertion 166 may have an "equals" assertion type and a JSON file as the expected output for a given test case 154. The test case 154 may pass the defined input(s) 162 to one or more of the target language-specific drivers 164 (e.g., as specified by the development environment 124 for the target language). The target language-specific drivers 164 may process the input(s) 162 to generate output data. The output data may be compared to the expected output defined by the assertion 166 to see if the expected output is the same as the expected JSON file output (since the assertion type is equals). In this example, a check to determine if the output matches the expected output is made based on the assertion type. However, other assertion types (e.g., inequality expressions) may be used. In general, the assertions 166 may define the type of comparison to be made and the expected value and/or threshold.

The development environment 124 may perform any desired number of tests on source data 130. For example, source data 130 may be code written in a first programming language (programming language 132). The development environment 124 may invoke the runtime of the language-agnostic unit tester 122 and may load the configuration data 152 and perform one or more specified test case(s) 154 on the source data 130. In various examples, the specific test cases to be performed may be specified by the developer (e.g., using an application programming interface of the language-agnostic unit tester 122). After each specified test case 154 is executed (and/or for each test case 154) the language-agnostic unit tester 122 may generate unit test result data 151 specifying the results of the unit tests. The developer may use such data to fix errors in the source data and/or to evaluate performance of source code under test.

The foregoing example is merely one possible implementation of a language-agnostic unit tester 122. The actual deployment of the various services and/or systems of the language-agnostic unit tester 122 are implementation-specific details and may be modified as desired in accordance with the present disclosure. The language-agnostic unit tester 122 may be deployed across any number of physical computing devices and/or virtualized computing environments, depending on the desired implementation.

Development environment 124 may be, for example, an integrated development environment (IDE) or other software development application that may include a source code editor, build automation tools, and/or debugging tools. In some examples, development environment 124 may also include one or more compilers, transpilers, and/or interpreters.

FIG. 2 depicts an example of language-agnostic configuration data 200 that may be used to perform unit testing of source code and/or other input data in any desired programming language, in accordance with various aspects of the present disclosure. In the example of FIG. 2, the language-agnostic configuration data 200 is written in a data serialization language (e.g., YAML). However, the language-agnostic configuration data may take other forms depending on the desired implementation. Line 2 represents a name of the configuration data representing a language-agnostic framework for unit testing. It should be noted that the specific examples of tests, the names, drivers, driver languages, inputs, and assertions depicted in the example of FIG. 2 are merely for illustrative purposes and that other data may be used according to the desired implementation. The example language-agnostic configuration data 200 depicted in FIG. 2 may include a variety of different unit tests (e.g., Test Case 1 and Test Case 2 in the depicted example). In some further examples, in addition to names of the unit tests, the language-agnostic configuration data may include description fields providing descriptions of the unit tests.

The inputs fields (e.g., lines 5 and 17) define the name and values of the inputs for the respective unit tests (e.g., Test Case 1 and Test Case 2). For example, for Test Case 1, the input name is openApiDocument having the value: tests/openapi/test-case-1.json. The drivers key field (lines 8 and 20) represents the target-language specific drivers used to implement the logic of the different unit tests in different target programming languages. Each of the different target programming languages may be identified using identifier data specific to that language. For example, for Test Case 1, a java driver and a python driver (two different target programming languages) are provided and identified with the values "java" and "python". As previously described, a developer may provide as few as a single driver (in a single target programming language) and the driver may be transpiled into other target programming languages in order to populate the language-agnostic configuration data. If a developer wants to use a unit test in a particular target language, but there is no driver for that target language the developer may transpile the available driver code or may provide the driver code in the desired target language. The driver code is provided in the "content" field at lines 10, 12, 22, and 24 along with a description of the language of the driver (e.g., at lines 9, 11, 21, and 23).

As shown in the example language-agnostic configuration data 200 shown in FIG. 2, the assertions field includes an assertion type (e.g., equals on lines 14 and 26) and an expected output (e.g., the expected result defined by the JSON files on lines 15 and 27). The assertion type indicates the type of comparison to be performed on the output of the unit test and the expected output represents the basis for comparison. For example, for Test Case 2, the tests/openapi/test-case-2.json file may be passed as input to the driver on line 22 and output data may be generated. The output may be compared to the tests/openapi/test-case-2_expected.json expected output file to determine if the data matches (due to the "equals" assertion type). In various other examples, inequality expressions (e.g., ≥, >, ≤, <) and/or thresholds may be used for the assertion type.

The configuration data 200 of FIG. 2 defines language-agnostic unit tests and does not include any semantics that are either language specific or specific to any particular unit-testing technology (e.g., JUnit, Jest). Only the driver data is language specific. However, since the driver data does not include any The language-agnostic unit tester 122 (FIG. 1) may be implemented as a command line utility or build phase plugin that may use code generation to generate unit tests in each target language. The generated test cases use unit testing technology specific to each target language. For example, when generating the test cases for Java, the language-agnostic unit tester 122 outputs JUnit test cases. When generating the test cases for JavaScript, the language-agnostic unit tester 122 outputs Jest test cases. The body of each unit test case (e.g., the content field in the configuration data 200) may come from the transpiled result of the test driver provided by the developer and/or may be explicitly defined by the developer.

FIG. 3 is flowchart illustrating an example process 300 for language-agnostic unit testing according to an example of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In various examples, the process 300 may include receiving first data including first source code written in a first programming language (block 310). For example, a library and/or any other source code to be tested may be received. In the example, the first source code may be written in a first programming language.

The process 300 may include loading first configuration data configured to execute language-agnostic unit testing (block 315). For example, the language-agnostic configuration data 200 described above and/or similar configuration data may be loaded. The language-agnostic configuration data 200 may define one or more unit tests for multiple target languages, as described above.

The process 300 may include determining first input data from the first data based on a first input defined by the first configuration data for a first unit test (block 320). For example, the first configuration data may define a first unit test (e.g., using a name field). The first unit test may be associated with one or more inputs (e.g., defined in an inputs field). The configuration data may be parsed to determine the appropriate inputs. In the current example, the inputs field may identify some or all of the data from the first data received at block 310. This data may serve as the input data (e.g., the first input data) for the first unit test.

The process 300 may include determining, from the first configuration data, a first driver written in the first programming language, the first driver including first computer-executable instructions configured to execute the first unit test (block 325). For example, the first driver associated with the first input data that is associated with the first programming language (e.g., the same programming language as the first source code) may be identified as the appropriate driver to perform unit testing of the first input data. The first input data may be passed to the first driver and at least one processor may execute the computer-executable instructions of the first driver to process the first input data using the first driver code.

The process 300 may include generating first output data by executing the first computer-executable instructions to perform the first unit test on the first input data (block 330). The first unit test may be testing logic defined by the first configuration data. There may be multiple drivers, with each driver being configured to implement the logic of the first unit test, albeit in a different programming language. The appropriate driver may be selected according to the programming language of the input data (e.g., the first source code received at block 310). The first input data (defined by the first configuration data) from the first data may be passed to the appropriate driver and the first unit test may be executed to generate first output data. In various examples, the first output data may be compared to expected output data defined by an assertion of the first unit test in the first configuration data.

Figure 4:
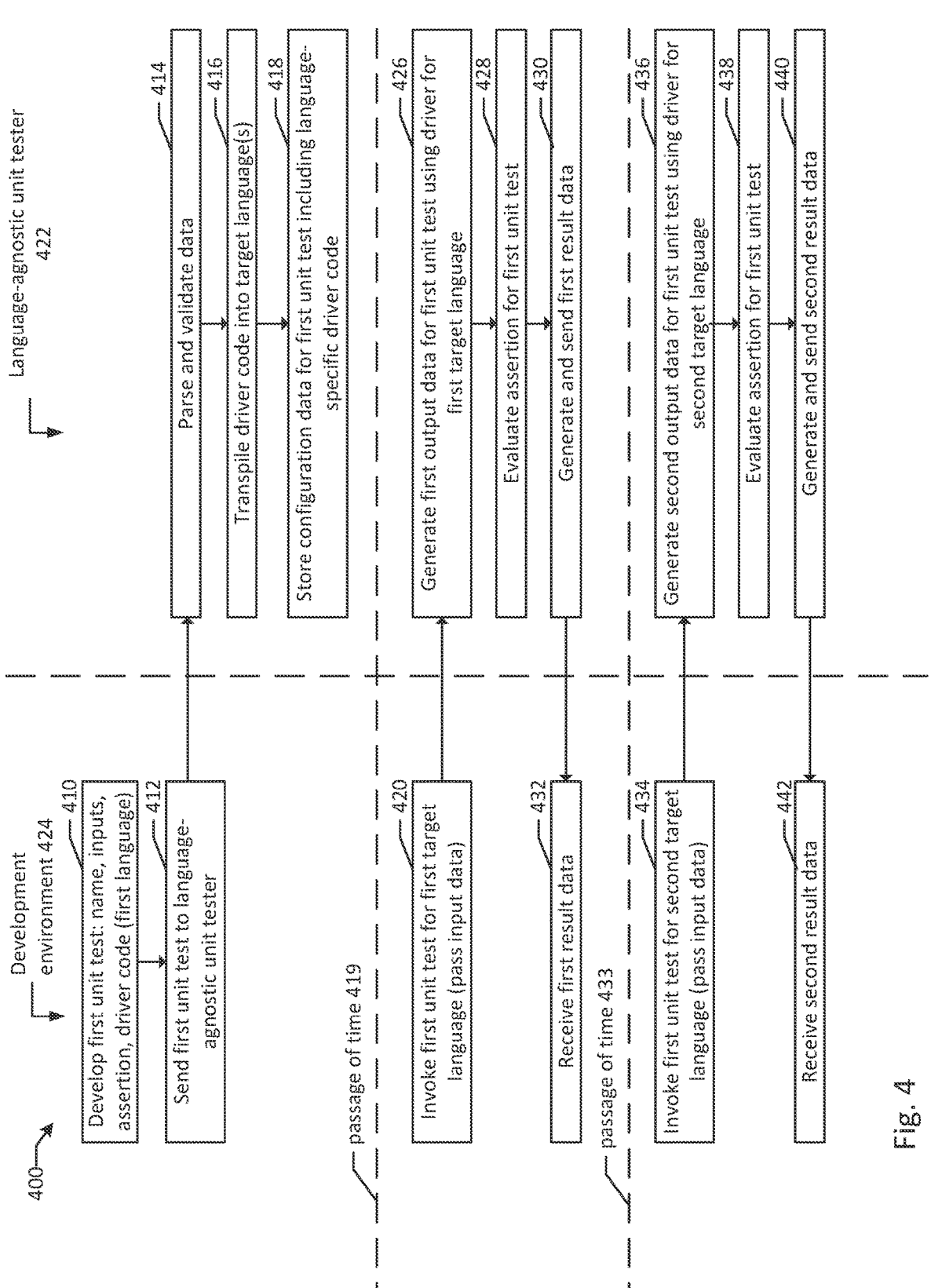
FIG. 4 illustrates an example flow diagram for performing a unit test for data composed in two different programming languages, according to various aspects of the present disclosure.

FIG. 4 illustrates an example flow diagram for performing a unit test for data composed in two different programming languages, according to various aspects of the present disclosure. Although the examples below are described with reference to the flow diagram illustrated in FIG. 4, many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, a developer may employ a development environment 424 to develop a first unit test including, for each desired unit test, a respective name, input(s), assertion(s), and driver code (block 410). In the example depicted in FIG. 4, the driver code may be provided in a single programming language (e.g., the "first language" of FIG. 4). However, in some other examples, various different drivers in different target programming languages may be provided by the developer. The driver code may be effective to implement the testing logic of the desired unit test, while the assertion(s) may validate the output of such unit tests. The development environment 424 may send the first unit test to the language-agnostic unit tester (block 412). The language-agnostic unit tester 422 may be a runtime environment configured to execute the language-agnostic unit tests.

The language-agnostic unit tester 422 may parse and validate the received first unit test (block 414) to ensure that an expected format is used and that the configuration data is parseable and usable for unit testing input data. In some examples, the language-agnostic unit tester 422 may be effective to transpile the driver code received from the development environment 424 into multiple target languages (block 416). This may enable libraries and other source code coded in different languages to be tested using the same unit test via the different language-specific driver code. The language-agnostic unit tester 422 may store the configuration data for the first unit test including the language specific driver code in memory (block 418).

After some passage of time 419, the development environment 424 may invoke the first unit test for code that is coded in a first target language (block 420). For example, the development environment 424 may pass the relevant input data (defined by the configuration data for the first unit test) to the language-agnostic unit tester 422. The language-agnostic unit tester 422 may generate first output data for the first unit test using the driver for the first target language (block 426). For example, the language-agnostic unit tester 422 may receive the input data from the development environment 424 (after the developer invokes the first unit test by name and receives the input data for the first unit test). The language-agnostic unit tester 422 may execute the relevant driver code which may process the input data to generate output data (according to the specific logic of the unit test as implemented by the driver code). The driver code may be stored in the configuration data and may be specific to the first target language.

After generating the output data, the language-agnostic unit tester 422 may evaluate one or more assertions for the first unit test (block 428). This may involve comparing the output data generated by the first unit test to an expected output according to a particular assertion type. Result data representing the result of the comparison may be generated and sent back to the development environment 424 (block 430). The development environment 424 may receive the first result data (block 432) and may use the result data to validate and/or debug the source code.

After some passage of time 433, the development environment 424 may again invoke the first unit test for different code that is coded in a second target language (block 434). For example, the development environment 424 may pass the relevant input data (defined by the configuration data for the first unit test) to the language-agnostic unit tester 422. The language-agnostic unit tester 422 may generate first output data for the first unit test using the driver for the second target language (block 436). For example, the language-agnostic unit tester 422 may receive the input data from the development environment 424 (after the developer invokes the first unit test by name and receives the input data for the first unit test). The language-agnostic unit tester 422 may execute the relevant driver code which may process the input data to generate output data (according to the specific logic of the unit test as implemented by the driver code). The driver code may be stored in the configuration data and may be specific to the second target language. The driver code for each specific target language in the configuration data may be configured to implement the same unit testing logic. As previously described, in some cases, the various instances of the driver code may be transpiled instances of the same source code.

After generating the output data, the language-agnostic unit tester 422 may evaluate one or more assertions for the first unit test (block 438). These assertions may be language agnostic. This may involve comparing the output data generated by the first unit test to an expected output according to a particular assertion type. Result data representing the result of the comparison may be generated and sent back to the development environment 424 (block 440). The development environment 424 may receive the first result data (block 442) and may use the result data to validate and/or debug the source code.

Figure 5:
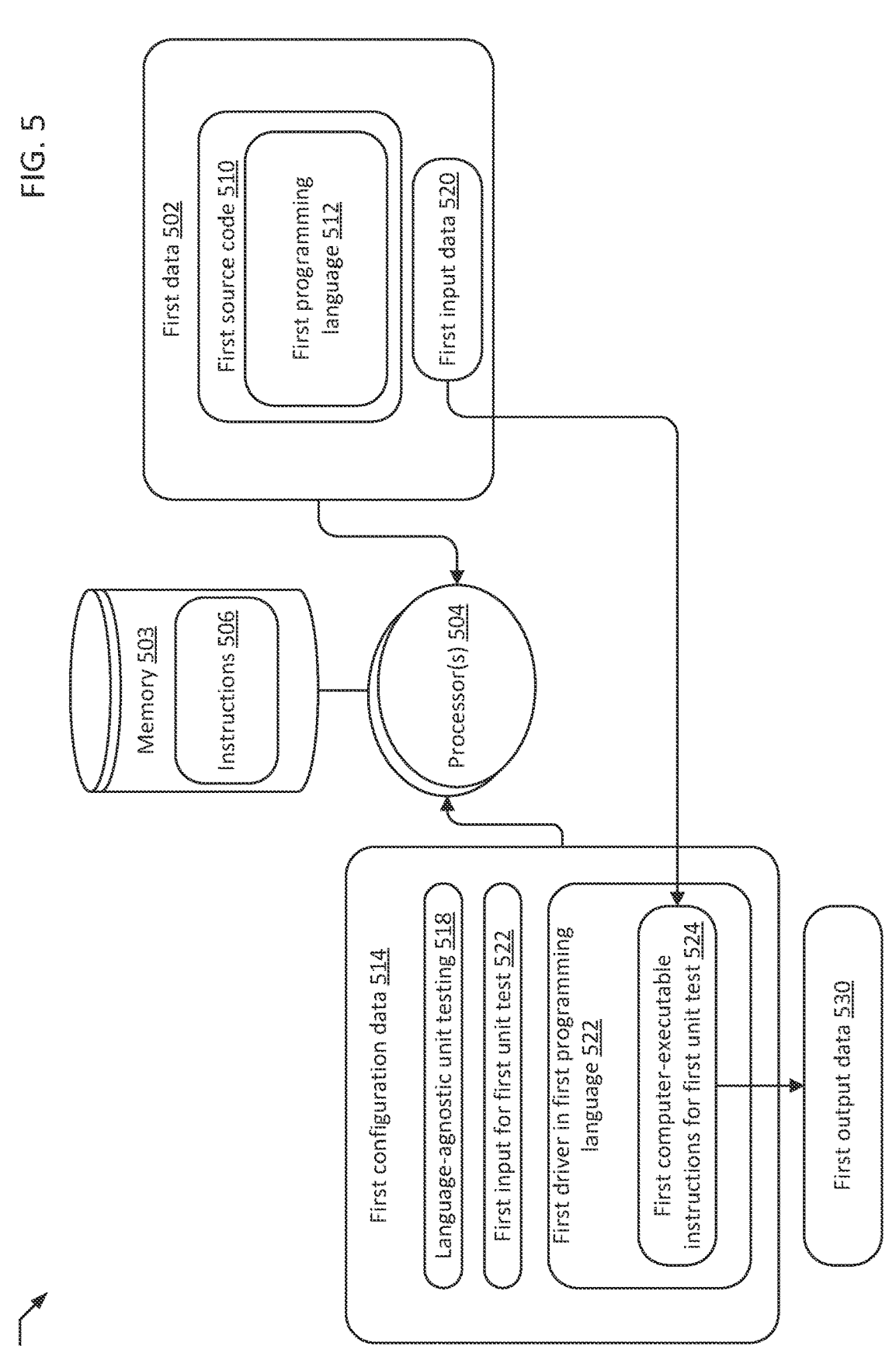
FIG. 5 is block diagram of a system effective to perform language-agnostic unit testing, according to an example of the present disclosure.

FIG. 5 is block diagram of a system 500 effective to perform language-agnostic unit testing, according to an example of the present disclosure. System 500 may comprise at least one processor 504 and non-transitory computer-readable memory 503. The memory 503 may store instructions 506. The instructions 506 may be executed by the at least one processor 504 to perform various techniques described herein related to language-agnostic unit testing 518.

The at least one processor 504 may receive first data 502 including first source code 510 written in first programming language 512 (e.g., Javascript, Java, Python, etc.). The at least one processor 504 may load first configuration data 514 configured to execute the language-agnostic unit testing 518. The at least one processor 504 may determine first input data 520 from the first data 502 (e.g., from the first source code 510) based on a first input defined by the first configuration data for a first unit test 522. The at least one processor 504 may determine, from the first configuration data 514, a first driver written in a first programming language 522. The first driver written in the first programming language 522 may include first computer-executable instructions 524 configured to execute the first unit test. The at least one processor 504 may generate first output data 530 by executing the first computer-executable instructions 524 to perform the first unit test on the first input data 520.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:

receiving, by a processor, first source code written in a first programming language;

loading, by the processor, configuration data into memory, wherein the configuration data defines a first unit test, wherein the configuration data comprises a language-agnostic portion that is without programming-language-specific annotations and semantics, wherein the language-agnostic portion of the configuration data comprises a first input for the first unit test and first assertion data for the first unit test, wherein the language-agnostic portion of the configuration data further comprises logic of the first unit test, wherein the configuration data further comprises driver data for the first unit test, the driver data specifying a first driver for implementing the first unit test and a programming language in which the first driver is written, wherein the first driver is transpilable into a different programming language, and wherein the first driver is transpiled into the first programming language;

based on the loaded configuration data indicating that the first driver is written in the first programming language, instantiating, by the processor, the first driver for use in performing the first unit test, the first driver comprising a first set of computer-executable instructions configured to execute the first unit test according to the logic of the first unit test defined in the loaded configuration data;

based on the loaded configuration data indicating that the first input is to be provided to the first unit test, passing, by the processor, first input data corresponding to the first input to the first driver; and executing, by the processor, the first set of computer-executable instructions of the first driver to implement the logic of the first unit test for performing the first unit test based on the first input data to generate first output data.

2. The method of claim 1, wherein the first driver is selected from among a plurality of drivers, specified in the configuration data for use in performing the first unit test, based on a determination that the first driver is written in the first programming language.

3. The method of claim 1, further comprising:

identifying, in the language-agnostic portion of the configuration data, the first assertion data defining a type of comparison and expected output data for the first unit test;

comparing the first output data of the first unit test to the first assertion data; and generating result data for the first unit test based at least in part on the comparison.

4. The method of claim 1, further comprising:

determining second input data for a second unit test based on the language-agnostic portion of the configuration data, the second unit test being different from the first unit test, and the second input data being different from the first input data;

determining, from the configuration data, that a second driver is written in the first programming language, the second driver comprising a second set of computer-executable instructions configured to execute the second unit test, the second driver being different from the first driver; and based on determining that the second driver is written in the first programming language, executing the second set of computer-executable instructions to perform the second unit test using the second input data, to thereby generate second output data.

5. The method of claim 1, further comprising:

receiving second source code written in a second programming language, the second programming language being different from the first programming language;

determining second input data for the first unit test from the second source code based on the first input defined in the language-agnostic portion of the configuration data, the second input data being different from the first input data;

instantiating, from the configuration data, a second driver for implementing the first unit test based on the driver data specified in the configuration data, the second driver comprising a second set of computer-executable instructions configured to execute the first unit test, and the second driver being different from the first driver; and executing the second set of computer-executable instructions of the second driver to perform the first unit test using the second input data, to thereby generate second output data.

6. The method of claim 1, further comprising:

receiving first driver code written in a second programming language, the second programming language being different from the first programming language;

transpiling the first driver code to generate at least the first driver in the first programming language and a second driver in a third programming language, the third programming language being different from the first programming language and the second programming language, and the second driver being different from the first driver;

storing a first identifier of the first driver in the configuration data for the first unit test; and storing a second identifier of the second driver in the configuration data for the first unit test.

7. The method of claim 6, further comprising:

storing first programming data in association with the first identifier in the configuration data, wherein the first programming data indicates the first programming language of the first driver; and storing second programming data in association with the second identifier in the configuration data, wherein the second programming data identifies the third programming language of the second driver.

8. The method of claim 1, wherein the first set of computer-executable instructions of the first driver are configured to validate the first input data against an expected result specified in the language-agnostic portion of the configuration data.

9. The method of claim 1, further comprising:

generating, for a second unit test defined in the configuration data, a second driver written in the first programming language, the second driver comprising second computer-executable instructions configured to execute the second unit test, the second unit test being different from the first unit test and the second driver being different from the first driver; and generating, for the second unit test defined in the configuration data, a third driver written in a second programming language, the third driver comprising third computer-executable instructions configured to execute the second unit test, the third driver being different from the first driver and the second driver, and the second programming language being different from the first programming language.

10. The method of claim 9, further comprising:

including, in the language-agnostic portion of the configuration data for the second unit test, second data identifying an input for the second unit test, wherein the second driver and the third driver are configured to receive the input and validate data received as the input.

11. The method of claim 9, further comprising:

causing a debugging tool to debug the first source code based on the first output data and the first assertion data.

12. The method of claim 1, wherein the language-agnostic portion of the configuration data is written in a data serialization language.

13. A system comprising:

at least one processor; and a non-transitory computer-readable memory storing instructions that, when executed by the at least one processor, are effective to:

receive first source code written in a first programming language;

load configuration data into memory, wherein the configuration data defines a first unit test, wherein the configuration data comprises a language-agnostic portion that is without programming-language-specific annotations and semantics, wherein the language-agnostic portion of the configuration data comprises a first input for the first unit test and first assertion data for the first unit test, wherein the language-agnostic portion of the configuration data further comprises logic of the first unit test, wherein the configuration data further comprises driver data for the first unit test, the driver data specifying a first driver for implementing the first unit test and a programming language in which the first driver is written, wherein the first driver is transpilable into a different programming language, and wherein the first driver is transpiled into the first programming language;

based on the loaded configuration data indicating that the first driver is written in the first programming language, instantiate the first driver for use in performing the first unit test, the first driver comprising a first set of computer-executable instructions configured to execute the first unit test according to the logic of the first unit test defined in the loaded configuration data;

based on the loaded configuration data indicating that the first input is to be provided to the first unit test, passing, by the processor, first input data corresponding to the first input to the first driver; and execute the first set of computer-executable instructions of the first driver to implement the logic of the first unit test for performing the first unit test based on the first input data to generate first output data.

14. The system of claim 13, the non-transitory computer-readable memory storing further instructions that, when executed by the at least one processor, are further effective to:

identify, in the language-agnostic portion of the configuration data, the first assertion data defining a type of comparison and expected output data for the first unit test;

compare first output data of the first unit test to the first assertion data; and generate result data for the first unit test based at least in part on the comparison.

15. The system of claim 13, the non-transitory computer-readable memory storing further instructions that, when executed by the at least one processor, are further effective to:

determine second input data for a second unit test based on the language-agnostic portion of the configuration data, the second unit test being different from the first unit test, and the second input data being different from the first input data;

determine, from the configuration data, that a second driver is written in the first programming language, the second driver comprising a second set of computer-executable instructions configured to execute the second unit test, the second driver being different from the first driver; and based on determining that the second driver is written in the first programming language, execute the second set of computer-executable instructions to perform the second unit test using the second input data, to thereby generate second output data.

16. The system of claim 13, the non-transitory computer-readable memory storing further instructions that, when executed by the at least one processor, are further effective to:

receive second source code written in a second programming language, the second programming language being different from the first programming language;

determine second input data for the first unit test from the second source code based on the first input defined in the language-agnostic portion of the configuration data, the second input data being different from the first input data;

instantiate, from the configuration data, a second driver for implementing the first unit test based on the driver data specified in the configuration data, the second driver comprising a second set of computer-executable instructions configured to execute the first unit test, and the second driver being different from the first driver; and execute the second set of computer-executable instructions of the second driver to perform the first unit test using the second input data, to thereby generate second output data.

17. The system of claim 13, the non-transitory computer-readable memory storing further instructions that, when executed by the at least one processor, are further effective to:

receive first driver code written in a second programming language, the second programming language being different from the first programming language;

transpile the first driver code to generate at least the first driver in the first programming language and a second driver in a third programming language, the third programming language being different from the first programming language and the second programming language, and the second driver being different from the first driver;

store a first identifier of the first driver in the configuration data for the first unit test; and store a second identifier of the second driver in the configuration data for the first unit test.

18. The system of claim 17, the non-transitory computer-readable memory storing further instructions that, when executed by the at least one processor, are further effective to:

store first programming data in association with the first identifier in the configuration data, wherein the first programming data indicates the first programming language of the first driver; and store second programming data in association with the second identifier in the configuration data, wherein the second programming data identifies the third programming language of the second driver.

19. A non-transitory computer-readable memory storing instructions that, when executed by at least one processor, are effective to perform operations comprising:

receiving first source code written in a first programming language;

loading language-agnostic configuration data into the non-transitory computer-readable memory, wherein the configuration data defines a first unit test, configuration data comprises a language-agnostic portion that is without programming-language-specific annotations and semantics, wherein the language-agnostic portion of the configuration data comprises a first input for the first unit test and first assertion data for the first unit test, wherein the language-agnostic portion of the configuration data further comprises logic of the first unit test, wherein the configuration data further comprises driver data for the first unit test, the driver data specifying a first driver for implementing the first unit test and a programming language in which the first driver is written, wherein the first driver is transpilable into a different programming language, and wherein the first driver is transpiled into the first programming language;

based on the loaded configuration data indicating that the first driver is written in the first programming language, instantiate the first driver for use in performing the first unit test, the first driver comprising a first set of computer-executable instructions configured to execute the first unit test according to the logic of the first unit test defined in the loaded configuration data;

based on the loaded configuration data indicating that the first input is to be provided to the first unit test, passing first input data corresponding to the first input to the first driver; and executing the first set of computer-executable instructions of the first driver to implement the logic of the first unit test for performing the first unit test based on the first input data to generate first output data.

20. The non-transitory computer-readable memory of claim 19, wherein the operations further comprise:

determining second input data for a second unit test based on the language-agnostic configuration data, the second unit test being different from the first unit test, and the second input data being different from the first input data;

determining, from the configuration data, that a second driver is written in the first programming language, the second driver comprising second computer-executable instructions configured to execute the second unit test, the second driver being different from the first driver; and based on determining that the second driver is written in the first programming language, executing the second computer-executable instructions of the second driver to perform the second unit test using the second input data, to thereby generate second output data.

* * * * *